United States Patent [19]

Rhodes

[11] Patent Number: 5,277,150
[45] Date of Patent: Jan. 11, 1994

[54] EXERCISE ASSEMBLY FOR A DOG

[76] Inventor: John Rhodes, 3427 SW. 64th Ave., Miami, Fla. 33155

[21] Appl. No.: 36,505

[22] Filed: Mar. 24, 1993

[51] Int. Cl.$^5$ ............................................. A01K 15/00
[52] U.S. Cl. ...................................................... 119/700
[58] Field of Search ........................ 119/29, 96; 482/54

[56] References Cited

U.S. PATENT DOCUMENTS

| | | | |
|---|---|---|---|
| 3,709,197 | 1/1973 | Moseley | 482/54 X |
| 4,095,561 | 6/1978 | Ruetenik | 119/29 |
| 4,205,628 | 6/1980 | Null | 119/29 |
| 4,332,217 | 6/1982 | Davis | 119/29 |
| 4,819,583 | 4/1989 | Guerra | 119/29 |

FOREIGN PATENT DOCUMENTS 1456069  2/1989  U.S.S.R. ................................. 119/29

Primary Examiner—Cary E. O'Connor
Assistant Examiner—Thomas Price
Attorney, Agent, or Firm—Malloy & Malloy

[57] ABSTRACT

An exercise assembly adapted to build endurance in dogs by allowing them to maintain a continuous running mode. A support frame serves to movably support a treadmill and a treadway mounted thereon wherein a plurality of independent, spaced apart roller assemblies support and allow the continuous linear movement of the closed configuration treadmill. The dog, running on the treadmill is prompted to continue his running motion by attempting to reach a bait animal maintained in a bait cage out of the reach of the dog being exercised.

16 Claims, 2 Drawing Sheets

EXERCISE ASSEMBLY FOR A DOG

BACKGROUND OF THE INVENTION

1. Field of the Invention

The present invention relates to an exercise assembly adapted to increase the endurance, by maintaining a dog or like animal in a running mode, by tempting him to reach a bait animal within a bait cage while being restrained to run exclusively on a continuously moving treadmill and treadway associate therewith.

2. Description of the Prior Art

There are numerous devices in use as well as in the patented prior art which are directed to the exercising of various types of animals, generally for the purpose of keeping the animals fit. Typically, horses and other animals that are trained primarily for racing or running may be exercised on a selective basis, even when injured, by the utilization of such devices. However, as indicated in the following prior art United States patents such devices are not limited exclusively to the use of horses or any particular variety of animal. In certain situations the exercising of a dog is highly desirable for purposes of building the dog's endurance, speed, etc. Such dogs are commonly trained to increase such endurance characteristics for purposes of racing, work, etc.

The Wedell Pat. No. 3,994,261 discloses an apparatus for exercising and training animals having a motorized treadmill as shown in the drawings associated therewith. The heart of this invention relates to the texture or structure of the actual material on which the animal exercises. More specifically, the floor or surface on which the animal runs is made to simulate the elasticity and physical properties of the natural surface or turf on which the animal normally exercises or runs. A belt is supported by and slides on a smooth plate and the endless belt is made of a flexible plastic material with a low co-efficient of friction to allow the motorized or driven movement thereof upon activation of the driving motor.

The Null U.S. Pat. No. 4,205,628 discloses an animal exercising device particularly designed for the exercise of horses and includes an inclined surface that keeps the horse walking uphill and thereby adds to the effort needed to be exerted by the horse as a motorized treadmill is continuously driven at variable speeds.

The Davis Pat. No. 4,332,217 discloses a controlled rate exerciser where the horse or animal being exercised is mounted on a motorized treadmill which is submerged at the bottom of a body of liquid as shown. The legs of the horse are submerged as the animal stands on the treadmill and the treadmill is in fact motorized to be driven at various speeds.

Somewhat similarly the Samson et al, Pat. No. 5,002,015 discloses an animal exerciser having a water pool in which there is a submerged treadmill which includes an endless belt having a top rung on which the animal travels. A support plate is perforated and air is blown through the perforations to lubricate and separate the region between the support plate and the top rung of the treadmill.

The Orlowski Pat. No. 4,232,630 discloses an animal exerciser which does not incorporate a treadmill but rather is directed to the exercising of horses in a straight line path including carriage and means for reciprocally moving the carriage in a substantially straight line direction as well as means for attaching the animal to the carriage and means for supporting the operative elements at a desired height. In a preferred embodiment an endless belt and means for connecting an anchor point on the belt to alternating positions on the carriage whereby the direction of travel of the carriage is reversed at each end of the travel. A harness or lead line is connected to the halter or other harness attached to the horse so that the horse will be continuously driven in a reciprocal path along the length of the apparatus.

The Senior et al, Pat. No. 4,074,657 is directed to a lure mechanism per se rather than its combination or attachment to any type of treadmill device. The lure is used to attract dogs, particularly greyhounds, such that when the lure is attacked or bitten a certain electronic stimulus or shock will be delivered to the animal which will supposedly affect its attraction to the lure. The lure may travel along a variety of paths as shown in the various Figures of this patent by movable belt or the like. There is no treadmill or treadway attached with this device or used in combination therewith for purposes of exercising the dog per say. Of additional interest is the Tisdell et al, Pat. No. 3,406,969.

SUMMARY OF THE INVENTION

The present invention relates to an exercising device particularly adapted to increase or strengthen the endurance of dogs for a variety of reasons such as but not limited to racing, working, hunting, fighting, etc. The subject exercise assembly includes a support frame designed and adapted to be mounted on the ground or any other supporting surface and also specifically adapted to movably support a treadmill thereon. The treadmill has a continuous closed configuration which is powered exclusively by the movement of the animal as the animal or dog assumes a running mode. A treadway is more specifically defined by an outer exposed area or surface of the treadmill on which the dog actually travels during his exercising. This movement alone, due to a roller means associated for movably supporting the treadmill on the support frame will cooperate with the dog's activity so as to allow the continuous movement of the treadmill as the dog runs along the treadway thereof and at the same time allowing the dog, while running to be maintained in a substantially same location.

The roller means includes two end roller assemblies each including a pair of end rollers interconnected by a roller shaft wherein the ends of the roller shaft are mounted by bearing means or the like to the support frame. Each of the end rollers of each end roller assembly supports an elongated continuously formed runner secured to the underside of the treadmill opposite to the treadway on which the dog travels. These runners are specifically designed to provide interconnecting contact to the end rollers as well as other supporting roller assemblies associated with the roller means to be described in greater detail hereinafter.

As set forth, the roller means includes a plurality of spaced apart support roller assembly pairs each including two support roller bearing structures. The support roller bearing structures of each support roller assembly pairs engages in rolling support, different ones of the aforementioned runners which are disposed in spaced apart, parallel relationship to one another and which are secured to an undersurface of the treadmill in a continuous, closed configuration. It is important to note that both the end roller assemblies and the supporting roller assembly pairs are "free wheeling" to the extent that they are not motorized or otherwise mechanically driven by any outside force other than the animal being exercised. This allows the dog being exercised to drive and cause continuous movement of the treadmill due to his running activity. As long as the dog walks or runs in the normal fashion, the treadmill will move continuously due to his contact with the treadway or path on which the dog travels. In order that the dog be maintained in substantially the same location on the treadpath of the treadmill during his running activity a restraining means is provided.

The restraining means includes an overhanging elongated cable, chain, wire, etc designed to have a leash or other lead attached thereto. The opposite end of the leash or lead is secured to the dog by a collar, harness or the like. Accordingly, the dog may in effect be pulling or straining against the leash or lead but due to its secured attachment to the restraining cable, chain, wire, etc. the dog will be forced to stay in the substantially same location a predetermined distance from one leading end of the support frame.

This leading end of the support frame has a bait cage mounted thereon. The bait cage is specifically adapted to be maintained out of the reach or contact by the dog being exercised since he is cooperatively maintained in substantially the same location due to the effect of the restraining means of the dog. The bait cage has a somewhat apertured and/or sidewall construction so that the dog being exercised can visually observe as well as smell and/or hear the bait animal maintained in the cage. The dog will be unable to reach the bait animal and therefore will be prevented from doing it harm but due to the natural inclination of the dog he will still attempt to reach the bait animal since he can clearly observe the bait animal in the cage. The bait cage may be removably attached and/or secured in spaced above relation to the supporting surface and on a level which allows clear observation of the bait animal for deliberate attraction of the dog thereto. Entrance means may be of course incorporated within the bait cage so as to place or remove the bait animal from the interior of the cage.

BRIEF DESCRIPTION OF THE DRAWINGS

For a fuller understanding of the nature of the present invention, reference should be had to the following detailed description taken in connection with the accompanying drawings in which.

Like references refer to like parts throughout the several views of the drawings.

DETAILED DESCRIPTION OF THE PREFERRED EMBODIMENTS

As shown in the accompanying Figures, the present invention relates to an exercising assembly generally indicated as 10. The exercising assembly includes a support frame having elongated legs as at 12, an overhanging cross bar as at 14, and interconnecting brace bars as at 16. The support frame is designed to movably support a treadmill generally indicated as 18 thereon. The treadmill in turn is adapted to provide the support, while walking or running, of a dog on an outer exposed portion thereof. This outer exposed portion may be defined more specifically as a treadway of the treadmill and is defined by a plurality of spaced apart slats, planks or other segments indicated as 20. The segments are disposed in spaced apart relation to one another and are arranged in a somewhat parallel orientation transversely to what may be considered the length of both these support frame 10 and the treadmill 18. The treadmill of course has a continuous, closed configuration so that the continuous running or travel of the dog will result in an uninterruptive treadpath displayed and exposed to him so that he may continue his running until he is tired or otherwise quits.

Figure 5:
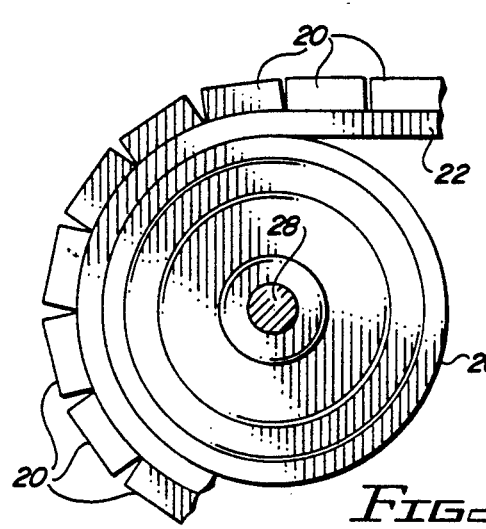
FIG. 5 is a detailed view in partial cut-away of an end roller assembly associated with the support and movement of the treadmill of the subject exercising assembly.
Figure 6:
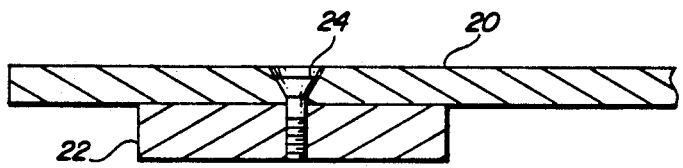
FIG. 6 is a detailed view and partial cutaway showing attachment of another component of the subject exercising assembly to the treadmill.

With reference to FIG. 6 two runners as at 22 are disposed in spaced, parallel relationship to one another adjacent opposite ends of the plurality of slats or segments 20. Attachment means may take any form as at 24 in order to secure the runners 22 to the undersurface of the plurality of parallel planks 20. Such attachment means may take the form of a bolt, screw, etc. These runners serve the purpose of interconnecting the plurality of slats to one another in the relative orientation shown clearly in FIGS. 1, 2 and 5 and also serve to provide a support base of the treadmill as it travels along and is supported by a roller means to be described in greater detail hereinafter.

Figure 1:
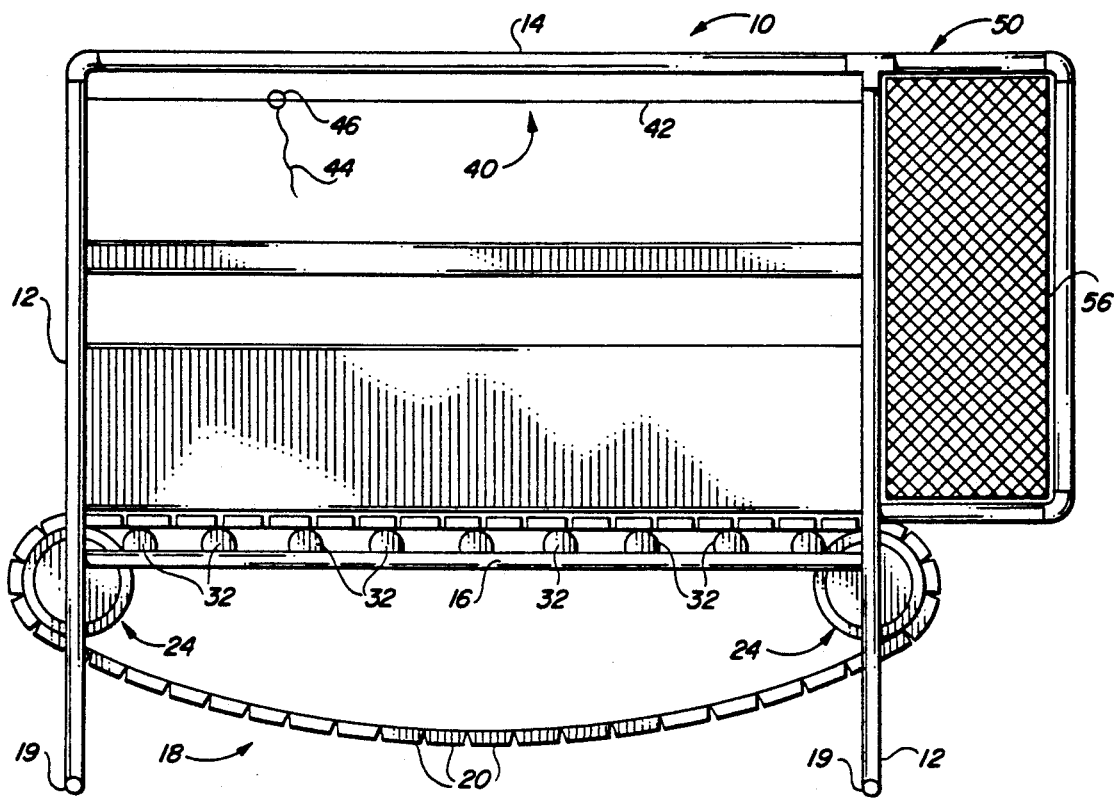
FIG. 1 is a side view of the subject exercising assembly.
Figure 2:
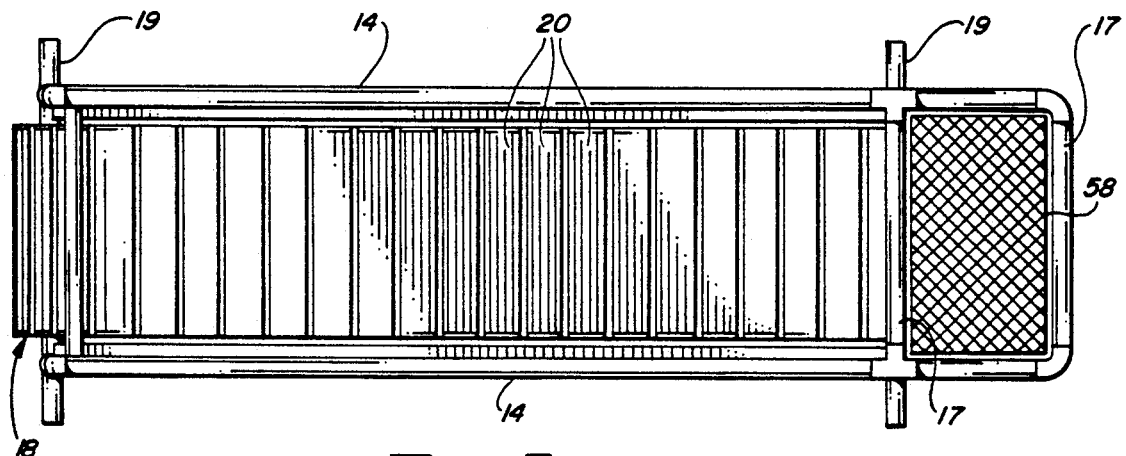
FIG. 2 is a top view of the embodiment of FIG. 1.
Figure 3:
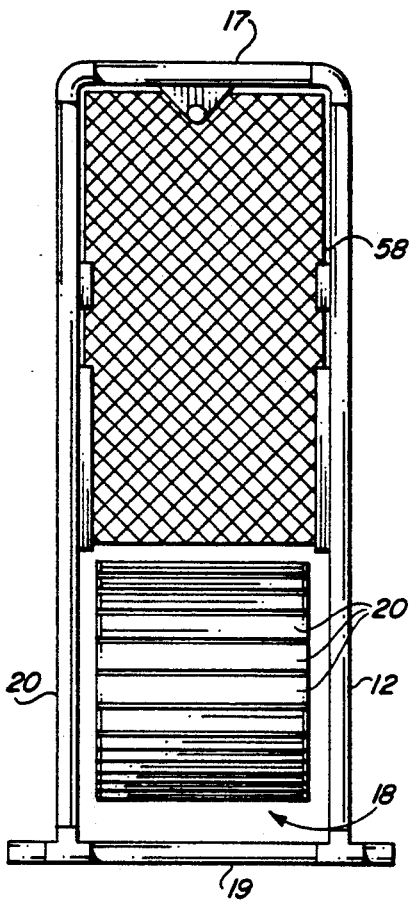
FIG. 3 is an end view of the embodiments of FIGS. 1 and 2.
Figure 4:
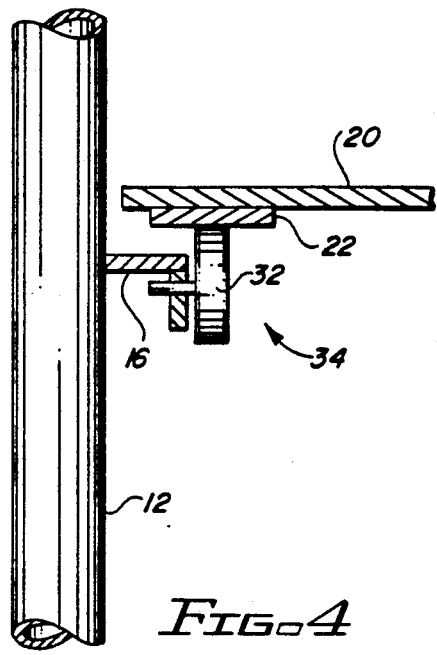
FIG. 4 is a detailed view and partial cut-away and section showing mounting of a treadmill portion of the subject exercising assembly on a supporting roller thereof.

As set forth above the movable support of the treadmill 18 is accomplished through the structural adaptation of a roller means. The roller means comprises two end roller assemblies 24 each of which includes two spaced apart end rollers 26 interconnected by a roller shaft as at 28. The roller shaft extends transversely relative to the path of the treadmill 18 and has its opposite extremities connected to and mounted on the support frame by virtue of bearing means as at 30 being secured to a cross brace bar 16 which may be in the form of an angle bar as shown in FIG. 4. The rollers 26, being part of the end roller assemblies, are somewhat larger than a plurality of support roller bearing structures as at 32 which may define a plurality of support roller assembly pairs. The support roller assembly pairs generally indicated as 34 include two support roller bearing pairs disposed in spaced apart, some what aligned relation to one another. The depiction of FIG. 4 represents the attachment of each of the support roller bearing structures 32 to the frame by angle iron 16 being attached to legs 12. Naturally, as shown in FIG. 1 the mounting of the end rollers 26 is such that the associated bearing means therewith, is not mounted on the brace bar 16 but is mounted otherwise on the support frame due to the increased size of the end rollers 26. A more detailed and accurate arrangement is shown in FIG. 1.

Each of the end rollers 26 and each of the support roller bearing structures 32 are mounted to supportingly engage and cause relative movement of the spaced apart parallel runners 22 as clearly and best shown in FIG. 4.

Similarly, the end rollers 26 also engage the runners as at 22 as best shown in FIG. 5. The runners 22 are formed of a flexible material that are fixedly attached to the slats or segments 20 so as to maintain them in proper parallel, spaced apart relation to one another.

It should be further pointed out that the slats are such as to be purposely spaced apart so as to give the dog or animal being exercised a firm gripping of his paws as they repetitively engage the exterior surface of the slats as should be obvious.

Figure 7:
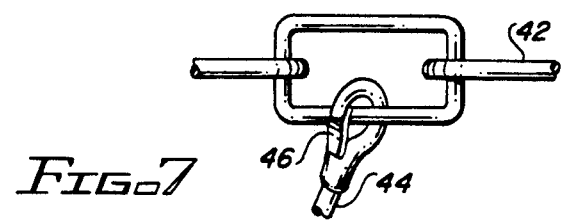
FIG. 7 is an overhead view of the leash-restraining member connection.

Other features associated with the present invention includes a restraining means generally indicated as 40 and including a restraining chain or wire as at 42 overhanging the path of travel of the dog as he travels along the treadway of the treadmill. The restraining member 42 is designed to have fixedly attached thereto a leash or lead as at 44 at one end 46. Particularly note the details of FIG. 7 wherein the restraining member 42 is in the form of a chain such that the attachment member 46 may be secured to one of the links without fear of allowing the attached member 46 to slide along the length thereof. The opposite end of the lead or leash is attached to a collar or harness which is secured to the dog in a conventional fashion as shown.

The motivating factor for encouraging the dog to walk and/or run at various speeds of the treadmill causing it to continuously move is the presence of a bait cage generally indicated as 50. The bait cage has an apertured end and/or sidewall construction as at 52 and is specifically adapted to house a bait animal therein. The bait animal is clearly observable to the dog once he is positioned on the treadmill thereby motivating him to attack or catch the bait animal as he views it. However, the structure of the end and sidewalls of such is to prevent actual harm or damage to the bait animal if in the unlikely event that the dog becomes free and attacks the cage in an attempt to reach the animal. A door or the like as at 58 provides access to the interior of the bait cage so as to position and remove the bait animal from within the bait cage. Other features associated with the subject invention include the addition of brace members 19 and 17 associated in interconnecting relation between the main cross bars or brace bars 14 as well as the elongated legs 12.

What is claimed is:

1. An exercise assembly designed to increase endurance in dogs, said assembly comprising:
   a) a support frame having an elongated configuration adapted to be removably disposed on a supporting surface,
   b) a treadmill having a closed, continuous configuration and being movably mounted on said support frame and adapted to travel freely along its length,
   c) roller means rotatably mounted on said support frame and disposed in rolling, supporting engagement with an under portion of said treadmill,
   d) a cage means mounted on said support frame at substantially one end of said treadmill and adapted for housing a bait animal therein, and
   e) said cage means having an apertured wall construction disposed and adapted to provide observation of the bait animal by a dog being exercised.

2. An assembly as in claim 1 wherein said cage means is structurally adapted to be isolated from physical contact with a dog movably supported on said treadmill.

3. An assembly as in claim 2 wherein said cage means is removably mounted on and supported by said support frame in spaced relation to the supporting surface.

4. An assembly as in claim 3 wherein said cage means further comprises an entrance disposed in oppositely positioned spaced relation to said treadmill.

5. An assembly as in claim 1 wherein said treadmill comprises a treadway extending along the length of said treadmill and dimensioned and structurally adapted to position a dog thereon in a running mode.

6. An assembly as in claim 5 wherein said treadmill comprises at least two runners disposed in spaced, substantially parallel relation to one another and each secured to an undersurface of said treadway and extending along the length thereof.

7. An assembly as in claim 6 wherein said roller means comprises two end roller assemblies each rotatably mounted on said supporting frame at a different end of said treadmill and in rolling, supporting engagement with said two runners.

8. An assembly as in claim 7 wherein each of said end roller assemblies comprises two end rollers interconnected by a roller shaft and each end roller disposed in rolling and supporting engagement with a different one of said runners continuously along its length.

9. An assembly as in claim 8 wherein said roller means further comprises a plurality of supporting roller assembly pairs each including a pair of support roller bearing structures rotatably and supportively engaging said runners continuously along the length thereof, said support roller assembly bearing structures of each pair disposed in spaced relation to one another.

10. An assembly as in claim 9 wherein said plurality of supporting roller assembly pairs are disposed in spaced relation to one another between said end roller assemblies.

11. An assembly as in claim 7 wherein said roller means further comprises a plurality of supporting roller assembly pairs each including a pair of support roller bearing structures rotatably and supportively engaging said runners continuously along the length thereof, said support roller bearing structures of each pair disposed in spaced relation to one another.

12. An assembly as in claim 11 wherein said plurality of supporting roller assembly pairs are disposed in spaced relation to one another between said end roller assemblies.

13. An assembly as in claim 12 wherein said end roller assemblies and said support roller assembly pairs are free wheeling and rotatably driven exclusively by movement of a dog on said treadway.

14. An assembly as in claim 1 wherein said roller means is free wheeling and rotatably driven exclusively by movement of a dog on said treadway.

15. An assembly as in claim 1 further comprising restraining means extending along the length of said support frame and in spaced above, overhanging relation to said treadmill and adapted for mounting a dog on said treadway in spaced relation to said bait cage.

16. An assembly as in claim 15 wherein said restraining means is further adapted to secure one end of a dog attached leash thereto.

* * * * *